July 26, 1932. J. LATZKO ET AL 1,869,221
INDICATING AND RECORDING APPARATUS
Filed Nov. 21, 1928   2 Sheets-Sheet 1

INVENTORS
Johann Latzko,
Otto Plechl.
BY
ATTORNEYS

July 26, 1932.  J. LATZKO ET AL  1,869,221
INDICATING AND RECORDING APPARATUS
Filed Nov. 21, 1928  2 Sheets-Sheet 2

INVENTORS
Johann Latzko,
Otto Plecht.
BY
ATTORNEYS.

Patented July 26, 1932

1,869,221

UNITED STATES PATENT OFFICE

JOHANN LATZKO, OF VIENNA, AND OTTO PLECHL, OF PFAFFSTATTEN, AUSTRIA, ASSIGNORS TO OESTERREICHISCHE BROWN-BOVERI-WERKE A. G., OF VIENNA, AUSTRIA

INDICATING AND RECORDING APPARATUS

Application filed November 21, 1928, Serial No. 321,022, and in Austria November 22, 1927.

The invention relates to a recording apparatus and more particularly to an electric measuring apparatus on the indicating surface of which an optical projection, either light on dark or dark on light is produced. Two methods are known for indicating by optical projection measured values. In the one method a projection of the image of a light or dark spot of constant size is produced on a scale. This method is objectionable for the reason that the reading from a greater distance is difficult without resorting to special expedients. In the other method the value measured is indicated by the limit between the shadow of a body illuminated from its rear side and the illuminated indicating surface of the apparatus, the position of the shadow producing body being varied, for instance by small motors controlled in accordance with the position of the measuring system. It is obvious that the latter method requiring a complicated mechanism is applicable only to particularly large apparatus.

According to the present invention the value measured is indicated by an optical projection of a light or shadow spot as in the first method above referred to. For simplifying the description it will be assumed in the following that a shadow spot is projected although it will be understood of course an illuminated spot might be projected in lieu of the shadow spot. However, according to the invention the shadow producing body is directly moved by the measuring system and its shadow is projected by optical means onto the illuminated scale surface. If, more particularly the arrangement is such that the shadow producing body bringing about the indication is situated between the condenser bus and the objective lens of a projection apparatus, then a number of important advantages is secured over the construction of measuring instruments heretofore known. If it is desired, that an accurate and distinct reading be possible within the entire range of the scale, then half shadows must be suppressed over the entire range of the scale and the indication of the value measured must be indicated by the limit between the full shadow of the said indicating body and the illuminated scale surface. In general this result can be arrived at only if the dimensions of the shadow producing body are large as compared with the dimensions of the source of light. However, by using the aforesaid optical projecting apparatus it is rendered possible to reduce at will the dimensions of the shadow producing body, so that the body hereinafter referred to as the pointer for the sake of brevity may have a much lower weight and more particularly a much lower momentum of inertia as compared with the constructions heretofore known which conditions lead to the advantages well known and highly valued in the art of constructing measuring instruments. But the use of optical means makes it furthermore possible to make the scale surface plane and to substitute for the mechanical guides heretofore used and lacking reliability and accuracy optical guiding means entirely frictionless, provided that on the one hand the axis of rotation of the instrument is so located relatively to the optical system that the shadow producing body the projection of which has to be obtained moves along a path concave relatively to the scale and that on the other hand the remaining faults of the projection be compensated for if necessary by a suitable construction of the system of lenses. By a special arrangement of a suitable optical system it is moreover possible to make the whole outline of the shadow sharp and accurate by suppressing any half shadows so that shadow producing bodies of any shape, for instance arrow shaped ones may be used. This permits to present to the eye of the observer the dimensions of the shadow and of the scale for comparison which secures a very clear reading even at great distances.

Figure 1:
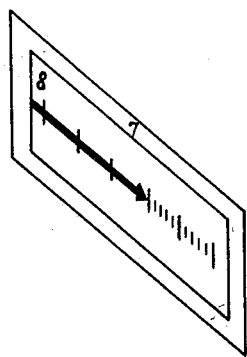
Figure 1 is a perspective view of the simplest embodiment of the improved apparatus, utilizing only one pointer.
Figure 1:
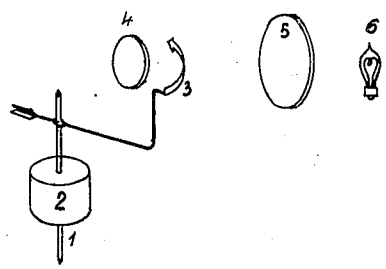

In the constructional form shown in Fig. 1, 1 is the shaft of a measuring instrument 2, for instance of a Ferraris drum. On the shaft 1 is mounted the arrow shaped body 3 indicating the value measured and moving between the objective lens 4 and the condensing lens 5 of a projection apparatus. 6 is the source of light. The front wall 7 of the indicating apparatus is provided with an opening for the frosted plate on which after adjusting the optical system an arrow shaped image of the pointer is projected. The front wall and the frosted plate are plane. The frosted plate carries a linear scale along which moves the arrow shaped shadow and shortens and lengthens according to the value measured.

If a plurality of values measured has to be indicated a plurality of pointers may be arranged in the same pencil of light and may be projected on the same scale surface. Apart from the cheapness and economy of space this arrangement may be advantageously used when a plurality of values measured is to be indicated which are in some relation to or have to be compared with each other.

Figure 2:
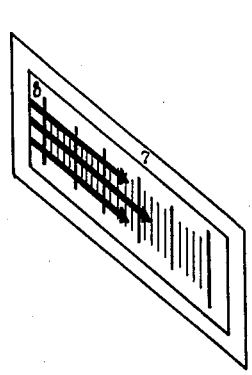
Figure 2 is a similar view of a modification of the apparatus employing a plurality of pointers.
Figure 2:
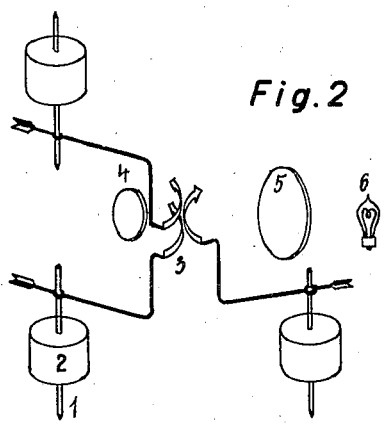

In Fig. 2, the same as in Fig. 1, 1 is the shaft of a measuring apparatus 2, for instance of a Ferraris drum, 3 is the shadow producing body indicating the value measured between the objective and the condensing lens 5 of a projection apparatus. The front wall 7 of the apparatus carries in an opening the frosted plate 8, on which a sharp shade of the body 3 is projected by the source of light 6, when the adjustment is properly made. For two further values measured the measuring systems 19 and 20 are so arranged that the pointers do not interfere with each other in their movements.

As will be seen the desired effect may be obtained for instance by locating all the shafts for the rotary movements of the pointers in a plane of symmetry of the projection apparatus and at right angles to the direction of projection. Preferably two of these shafts will be always in alignment. If more than two pointer systems have to be provided a particularly simple arrangement of the pointers may be obtained for instance and also equal angles of rotation for equal movements of the shadow by arranging the axes of the pointers in pairs symmetrically to the common tangential plane of the cylindrical surfaces in which take place the movements of the pointers.

The objective produces more sharp images of pointers which move along paths concave relatively to the objective. If pointers having a concave curvature and pointers having a convex curvature have to be projected simultaneously, the pointers having a convex path relatively to the objective are preferably arranged in the middle of the pencil of light so that the lack of sharpness due to the curvature of the object is not still further increased by the lack of sharpness of the edges. Thus a practically sufficient sharpness may be obtained for all the pointer images.

If the values measured by the various systems have to be compared with each other their characteristics have to be so adjusted that the lengths of the shadows permit comparison of the values measured. This must be for instance the case if by the apparatus the symmetry or the asymmetry of a distributing system comprising a plurality of mains (polyphase system) has to be ascertained. If, say the currents of the three phases of a three-phase system have to be measured the apparatus have to be so adjusted that equal lengths of the arrows in the three phases correspond with practically sufficient accuracy to equal values measured. But not only values measured of the same nature may be compared with each other, but if three values measured are in a functional relation, from the relation of two of such values the third may be determined.

Furthermore it is possible to so construct one or more of the pointers that they are moved by other pointers in one direction only and thus indicate the maximum or minimum values reached.

Figure 3:
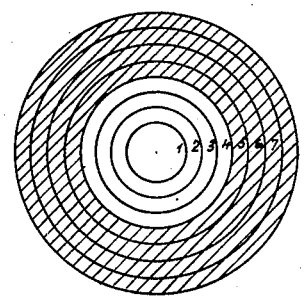
Figures 3 and 4 are diagrams respectively illustrating the use of illuminated and dark spots instead of pointer projections.
Figure 4:
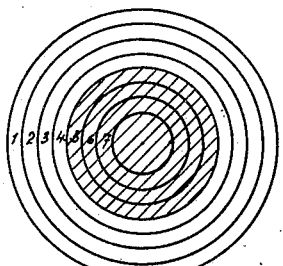
Figure 5:
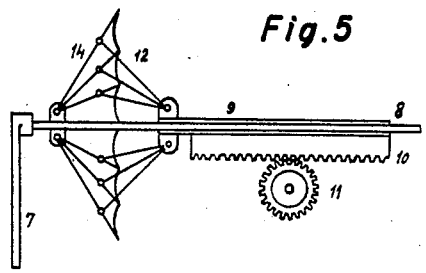
Figure 5 is a view illustrating a collapsible diaphragm to be used in connection with the improved apparatus, especially for producing the dark spot of Figure 4.

Instead of making the scale of the apparatus linear also a scale extending over an entire surface may be used which surface may be plane or for instance may be the segment of a sphere. Fig. 3 shows such a scale field in which the scale marks are represented by concentric circles. The value measured is indicated in this case determined by a circle congruent to the scale values which increases and decreases as the value measured varies leaving free the centre of the scale field. The limit between light and shadow indicating the value measured is in this case produced by an iris diaphragm the opening of which is controlled by the measuring system of the apparatus. But also the opposite arrangement is possible in which the circular scale field is dark in the centre and the shadow surface is reduced as the value measured increases, see Fig. 4. The arrangement of the diaphragm for such an apparatus is shown in Fig. 5. On the carrier 7 the spindle 8 is secured on which slides a sleeve 9 provided with a rack 10. The measuring apparatus brings about through the medium of a pinion 11 an axial movement of the sleeve. Rods 12 are secured to eyes of the sleeve and actuate ribs 14 which are connected with each other by an opaque fabric or material similar to an umbrella covering.

Figure 6:
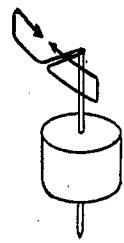
Figure 6 is a perspective view of a measuring instrument carrying a double pointer.
Figure 7:
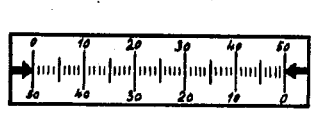
Figure 7 is a diagram of a scale plate illustrating the image of a pointer such as shown in Figure 6.

In apparatus in which positive and negative values of the quantity measured have to be distinguished and therefore the measuring apparatus rotates in a positive and a negative direction relatively to the position of rest two pointer images may be produced by using a double pointer as shown in Fig. 6, which according to the direction of elongation appear alternately in opposite directions on the scales which then carries two numberings progressing in opposite directions as shown in Fig. 7 illustrating the apparatus in the zero position.

Figure 8:
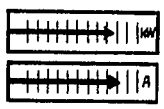
Figures 8 and 9 are diagrammatic views showing indications obtainable by the apparatus in Figure 2.
Figure 9:
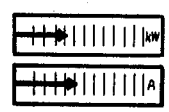

It happens frequently that the indications of two measuring apparatus are in a functional relation. Thus for instance if there are alternate current plants having a constant voltage the relation between power and current gives a measure for the power factor (cos $\varphi$). Now the present arrangement of the measuring apparatus may be advantageously utilized for dispensing with a third apparatus by suitably arranging two other apparatus, see Figs. 8 and 9. In these figures the upper system indicates the power or load and the lower one indicates the current. If now the scale pointers of the measuring apparatus are projected directly side by side, then the relative position of the two pointer images indicates the third independent quantity. The arrangement may be such that the two arrow shadows are of the same length and the points of the arrows are directly the one above the other of cos $\varphi=1$ at the particular moment as shown in Fig. 8. As cos $\varphi$ decreases the current arrow will be more ahead as shown in Fig. 9.

Figure 10:
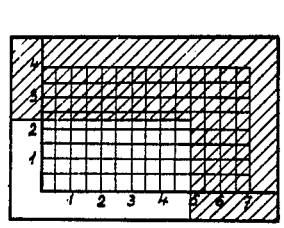
Figures 10 and 11 illustrate indications obtainable by other constructional forms of the apparatus.

However, with such measuring apparatus it is possible to represent functional relations also in another manner. If in the pencil of light two diaphragms are interposed the one behind the other, such diaphragms being controlled by different measuring apparatus a third independent quantity may be determined by the amount of overlapping of the images of the two diaphragms. If for instance a rectangular diaphragm is moved in a vertical direction and a second rectangular diaphragm is moved horizontally then on the frosted plate an image as shown in Fig. 10 is seen. If for instance the vertically movable diaphragm is controlled by the voltage and the horizontally movable is controlled by the current then, linear divisions being assumed, the area of the rectangle measures the apparent load.

Figure 11:
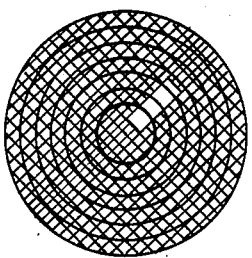
Figure 12:
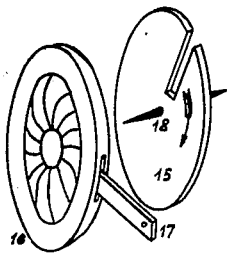
Figure 12 is a perspective view illustrating the combination of iris and slot diaphragms to be used in connection with the improved apparatus for obtaining the projection shown in Figure 11.

For representing vector quantities for instance the arrangement illustrated in Fig. 12 may be provided. A circular diaphragm 15 having a radial slot and an iris diaphragm are arranged coaxially the one in rear of the other in the pencil of light of the projection apparatus. The diaphragm 15 is rotatably mounted on its axis as is indicated in the figure by an arrow. The iris diaphragm 16 may be adjusted to different openings by the adjusting lever 17. If now the slotted diaphragm 15 is adjusted to the direction of a vector and the opening of the iris diaphragm 16 is adjusted to the absolute or numeric value of the vector the image shown in Fig. 11 will appear on the frosted plate in which image the illuminated spot indicates the value and the direction of the vector.

The method hereinbefore described for indicating values measured is of course not limited to electric quantities alone, it is on the contrary possible to indicate a great variety of quantities measured according to the measuring apparatus used.

What we claim is:

1. An indicating apparatus comprising a surface at least part of which is pervious to light, at least one body at least part of which is opaque, an optical projection apparatus adapted to project an image of such body on the said surface, and means for operatively connecting the said body with a measuring apparatus.

2. An indicating apparatus comprising a surface at least part of which is pervious to light, at least one body at least part of which is opaque, an optical projection apparatus comprising an objective and adapted to project an image of such body on the said surface, means for rotating such body around an axis located between the said surface and the said objective, whereby the said body moves along a path concave relatively to the said surface, and means for operatively connecting the said body with a measuring apparatus.

3. An indicating apparatus comprising a surface at least part of which is pervious to light, at least one body at least part of which is opaque, an optical projection apparatus comprising an objective and adapted to project an image of such body on the said surface, means for rotating such body around an axis located between the said surface and the said objective, whereby the said body moves along a path concave relatively to the said surface, and means for operatively connecting the said body with a measuring apparatus, the spherical correction of the said objective resulting in an image field curvature having a radius approximately equal to that of the circle along which moves the said body.

4. A screen having calibrated indicia applied thereto, a source of light to throw a beam upon the screen to illuminate the indicia, and means carried by a measuring apparatus, being movable between the source of light and screen by operation of said apparatus to block out part of the indicia according to the action of said apparatus.

5. A screen having a calibrated area, means to throw a beam of light upon the screen to illuminate said area, an opaque pointer situated in the path of the beam to throw a shadow upon the screen, and means to connect the pointer with a movable part of a measuring apparatus, causing the shadow to traverse the calibrations.

6. An elongated pointer, means to connect the pointer with a turnable part of a measuring apparatus, a source of light to throw a beam on one side of the pointer, and a screen to intercept the beam, said screen having a rectilinear scale upon which the rectilinear shadow of the pointer is superimposed.

7. An indicating apparatus comprising at least two shafts, each of said shafts carrying at least one indicating body at least part of which is opaque, a source of light illuminating the said bodies, said shafts being located on opposite sides of the light beam, said bodies being movable across the light beam, a screen to intercept the light beam, and means connected to the respective shafts of the said bodies for variously turning the shafts and correspondingly shifting said bodies across the light beam.

8. An indicating apparatus comprising three shafts being axially situated in a common plane, each of the said shafts carrying at least one indicating body at least part of which is opaque, a source of light illuminating the said bodies, two of the said shafts being in alinement with each other and located on opposite sides of the light beam, the other shaft being parallel to one shaft of said pair and located on the same side of the light beam, a screen to intercept the light beam, and means for variously turning the respective shafts and correspondingly shifting said bodies across the light beam.

9. Indicating apparatus comprising turnable means, indicating means mounted on said turnable means comprising two spaced opaque parts, a source of light illuminating said parts, a calibrated screen for intercepting the light beam, and means connecting the turnable means with measuring apparatus.

10. Indicating apparatus comprising a plurality of turnable means, a source of light to project a beam, on the opposite sides of which beam two of said turnable means are located and on one side of which beam the remaining turnable means is located, separate indicating means illuminated by the light beam being carried by the respective turnable means, two of said indicating means being in spaced relationship, the remaining indicating means operating substantially in the space between said two indicating means, a screen having a scale, said screen to intercept the light beam and reveal the shadows of said indicating means, and measuring apparatus with which the turnable means are connected.

11. An indicating apparatus comprising a projection apparatus, four axes of rotation, each of the said axes carrying at least one indicating body at least part of which is opaque, a source of light illuminating the said bodies, two of the said axes in alignment with each other being located on one side and two of the said axes in alignment with each other being located on the opposite side of the said body plane, all of the said axes being parallel to the said body plane and all of the said bodies moving approximately in the said body plane and means operatively connected to the axes of the said bodies for adjusting the said bodies to given quantities.

12. An indicating apparatus comprising a projection apparatus, four axes of rotation, each of the said axes carrying at least one indicating body at least part of which is opaque, a source of light illuminating the said bodies, two of the said axes in alignment with each other being located on one side and two of the said axes in alignment with each other being located on the opposite side of the said body plane, the two axes on one side of the body plane being symmetrical to the two axes on the opposite side of the body plane relatively to the latter and all of the said axes being parallel to the said body plane and all of the said bodies moving approximately in the said body plane and means operatively connected to the axes of the said bodies for adjusting the said bodies to given quantities.

13. In a measuring arrangement, a source of light, a scale, a rotating system, and an opaque screen coupled with said rotating system and adapted to be placed between said source of light and said scale, said screen being of sufficient length to cast a shadow stripe on the entire length of said scale.

14. In a measuring arrangement, a source of light, a scale, a rotating system, and an opaque screen coupled with said rotating system and adapted to be placed between said source of light and said scale, said screen being of sufficient length to cast a shadow stripe on said scale of a length equal to the length of said scale.

15. In a measuring arrangement, a source of light, a scale, a rotating system, and an opaque screen coupled with said rotating system and adapted to be placed between said source of light and said scale, said screen being of sufficient length to cast a shadow stripe on said scale equal in length to the length of said scale, said screen in its normal position casting its shadow on the whole length of said scale whereby movement of said screen in either direction causes movement of said shadow to permit some of the light to fall on one end or the other of said scale.

16. In a measuring arrangement, a source of light, a pair of scales placed side by side, a pair of rotating systems and screens coupled to each of said rotating systems and adapted to be placed between said source of light and said scales and on either side of the direct line from said source of light to said scales, whereby each of said screens casts a shadow on one of said scales.

17. In a measuring arrangement, a source of light, a pair of scales placed side by side, a pair of rotating systems and screens coupled to each of said rotating systems and adapted to be placed between said source of light and said scales and on either side of the direct line from said source of light to said scales, whereby each of said screens casts a shadow on one of said scales, each of said screens being of sufficient length to cast shadow stripes on said scales of a length equal to the length of said scales.

In testimony whereof we have affixed our signatures.

JOHANN LATZKO.
OTTO PLECHL.